US012654257B2

(12) United States Patent
Lee et al.

(10) Patent No.: US 12,654,257 B2
(45) Date of Patent: Jun. 16, 2026

(54) WELDING METHOD AND WELDING APPARATUS FOR SECONDARY BATTERY, AND MONITORING METHOD AND MONITORING APPARATUS FOR SECONDARY BATTERY WELDING PROCESS

(71) Applicant: LG ENERGY SOLUTION, LTD., Seoul (KR)

(72) Inventors: Jin Yeong Lee, Daejeon (KR); Jin Soo Lee, Daejeon (KR); Bu Won Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 685 days.

(21) Appl. No.: 18/024,736

(22) PCT Filed: Sep. 9, 2021

(86) PCT No.: PCT/KR2021/012295
§ 371 (c)(1),
(2) Date: Mar. 3, 2023

(87) PCT Pub. No.: WO2022/055278
PCT Pub. Date: Mar. 17, 2022

(65) Prior Publication Data
US 2023/0356327 A1 Nov. 9, 2023

(30) Foreign Application Priority Data

Sep. 10, 2020 (KR) ........................ 10-2020-0116432
Sep. 11, 2020 (KR) ........................ 10-2020-0117213
(Continued)

(51) Int. Cl.
*B23K 26/21* (2014.01)
*B23K 31/12* (2006.01)

(52) U.S. Cl.
CPC ............ *B23K 26/21* (2015.10); *B23K 31/125* (2013.01)

(58) Field of Classification Search
None
See application file for complete search history.

(56) References Cited

U.S. PATENT DOCUMENTS 5,260,965 A 11/1993 Nakazeki et al.
2009/0317712 A1 12/2009 Kim et al.
(Continued)

FOREIGN PATENT DOCUMENTS

CN 110326154 A 10/2019
JP 04230953 A * 8/1992
(Continued)

OTHER PUBLICATIONS

Translation of KR-20150125387-A (Year: 2015).*
(Continued)

*Primary Examiner* — Elizabeth M Kerr
(74) *Attorney, Agent, or Firm* — Morgan, Lewis & Bockius LLP

(57) ABSTRACT

A welding apparatus is provided for a secondary battery having an electrode assembly with a center hole seated on a lower can. The welding apparatus includes a jig which includes an insertion portion that has a pipe shape and a diameter enabling entry into the center hole of the electrode assembly and a seating portion that has an enlarged diameter of a disk shape on an end of the insertion portion; and a laser irradiation apparatus to emit a laser beam into a hole of the insertion portion. When the electrode assembly is seated on the lower can such that an electrode tab of the electrode assembly is placed within the center hole, the laser irradiation apparatus performs a weld between the inner bottom
(Continued)

surface of the lower can and the electrode tab after passing through the hole of the insertion portion of the jig.

13 Claims, 12 Drawing Sheets

(30)        Foreign Application Priority Data

Sep. 11, 2020    (KR) ........................ 10-2020-0117214
Sep. 8, 2021    (KR) ........................ 10-2021-0119653

(56)        References Cited

U.S. PATENT DOCUMENTS

| | | |
|---|---|---|
| 2012/0100406 A1 | 4/2012 | Gaugler |
| 2012/0211474 A1 | 8/2012 | Hayashimoto et al. |
| 2017/0187008 A1 | 6/2017 | Gaugler |
| 2018/0013101 A1 | 1/2018 | Gaugler |
| 2018/0045232 A1 | 2/2018 | Capostagno et al. |
| 2018/0311768 A1 | 11/2018 | Tsukui |
| 2020/0099018 A1 | 3/2020 | Gaugler |
| 2020/0194736 A1 | 6/2020 | Gaugler |
| 2020/0212373 A1 | 7/2020 | Gaugler |
| 2020/0212374 A1 | 7/2020 | Gaugler |
| 2020/0251789 A1 | 8/2020 | Park et al. |
| 2020/0259133 A1 | 8/2020 | Tominaga et al. |
| 2021/0184298 A1 | 6/2021 | Gaugler |
| 2021/0213563 A1 | 7/2021 | Tsukui |
| 2021/0265686 A1 | 8/2021 | Gaugler |
| 2021/0399369 A1 | 12/2021 | Gaugler |
| 2021/0399370 A1 | 12/2021 | Gaugler |
| 2022/0209337 A1 | 6/2022 | Gaugler |

FOREIGN PATENT DOCUMENTS

| | | | | |
|---|---|---|---|---|
| JP | H07-029210 | B2 | | 4/1995 |
| JP | H09-201687 | A | | 8/1997 |
| JP | 2003-001465 | A | | 1/2003 |
| JP | 2003-251476 | A | | 9/2003 |
| JP | 3512388 | B2 | | 3/2004 |
| JP | 2004158318 | A | * | 6/2004 |
| JP | 2011-255420 | A | | 12/2011 |
| JP | 2012-170989 | A | | 9/2012 |
| JP | 2012-530337 | A | | 11/2012 |
| JP | 5224349 | B2 | | 7/2013 |
| JP | 5580788 | B2 | | 8/2014 |
| JP | 2015-147219 | A | | 8/2015 |
| JP | 2015-162270 | A | | 9/2015 |
| JP | 2016-083684 | A | | 5/2016 |
| JP | 2018-187636 | A | | 11/2018 |
| JP | 2020-040087 | A | | 3/2020 |
| KR | 10-1996-0005214 | B1 | | 4/1996 |
| KR | 10-2008-0077424 | A | | 8/2008 |
| KR | 10-0897797 | B1 | | 5/2009 |
| KR | 10-0921662 | B1 | | 10/2009 |
| KR | 10-1296944 | B1 | | 8/2013 |
| KR | 10-1351762 | B1 | | 1/2014 |
| KR | 10-1428973 | B1 | | 8/2014 |
| KR | 10-1528344 | B1 | | 6/2015 |
| KR | 10-2015-0125387 | A | | 11/2015 |
| KR | 20150125387 | A | * | 11/2015 ........... H01M 10/04 |
| KR | 10-2017-0050440 | A | | 5/2017 |
| KR | 20170050440 | A | * | 5/2017 ............ B23K 26/21 |
| KR | 20170059176 | A | * | 5/2017 ......... H01M 2/0267 |
| KR | 10-2017-0116123 | A | | 10/2017 |
| KR | 10-2018-0013481 | A | | 2/2018 |
| KR | 10-1992241 | B1 | | 6/2019 |
| KR | 10-2020-0002422 | A | | 1/2020 |
| KR | 10-2020-0007559 | A | | 1/2020 |
| KR | 10-2020-0007562 | A | | 1/2020 |
| KR | 10-2114359 | B1 | | 5/2020 |

OTHER PUBLICATIONS

Translation of JP-04230953-A (Year: 1992).*
Translation of JP-2004158318-A (Year: 2004).*
Translation of KR-20170050440-A (Year: 2017).*
Translation of KR-20170059176-A (Year: 2017).*
International Search Report (with partial translation) and Written Opinion dated Dec. 28, 2021, for corresponding International Patent Application No. PCT/KR2021/012295.
Office Action issued on Dec. 6, 2025 in Chinese Patent Application No. 202180062011.8. (Note: KR20170050440A, KR20150125387A, JPH09201687A, KR20080077424A and US2020259133A1 cited therein are already of record.).

* cited by examiner

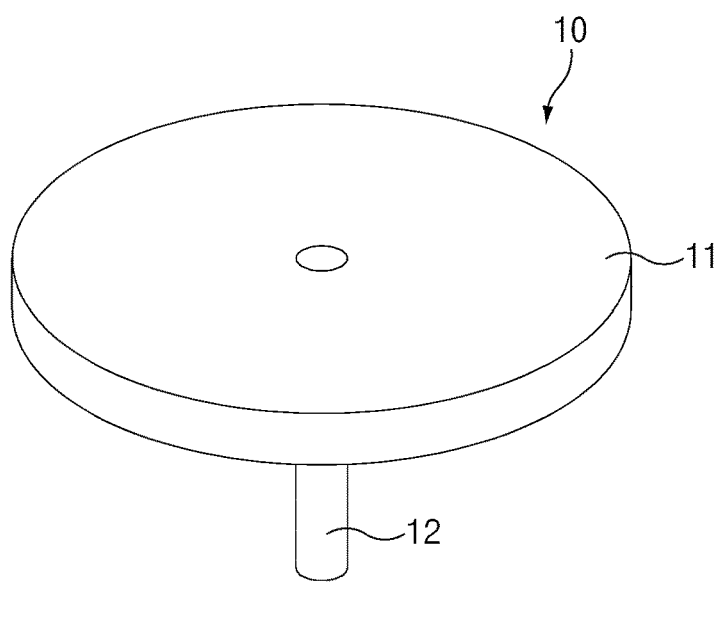
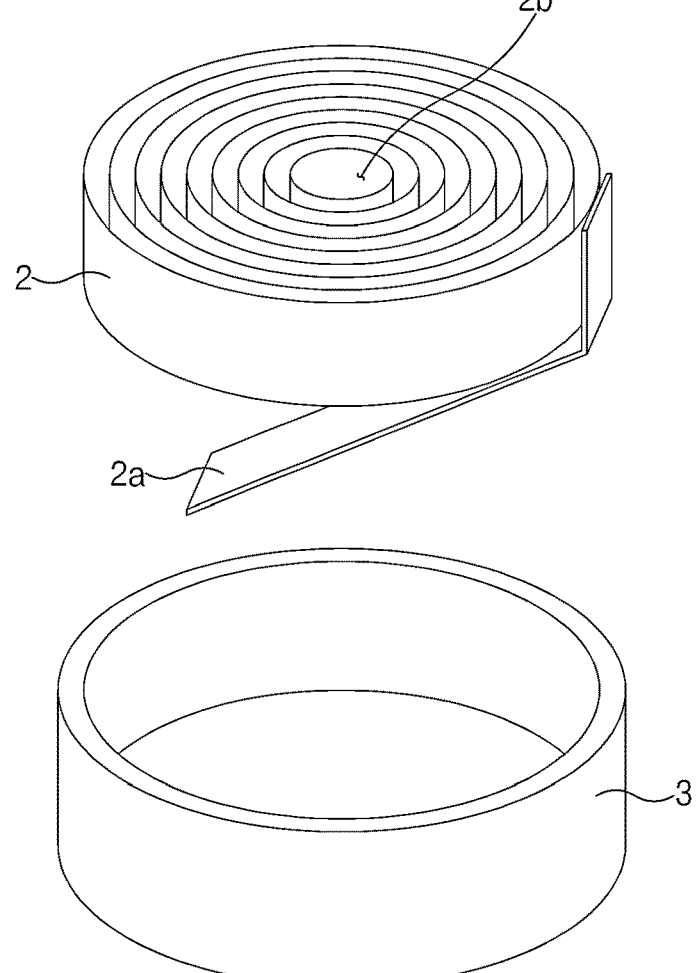
F I G . 3

ONE POINT WELDING

THREE POINT WELDING (a)                  (b)

(c)                  (d)

WELDING METHOD AND WELDING APPARATUS FOR SECONDARY BATTERY, AND MONITORING METHOD AND MONITORING APPARATUS FOR SECONDARY BATTERY WELDING PROCESS

CROSS-REFERENCE TO RELATED APPLICATION

The present application claims the benefit of the priority of Korean Patent Application No. 10-2020-0116432, filed on Sep. 10, 2020, Korean Patent Application No. 10-2020-0117213, filed on Sep. 11, 2020, Korean Patent Application No. 10-2020-0117214, filed on Sep. 11, 2020, and Korean Patent Application No. 10-2021-0119653, filed on Sep. 8, 2021, which are hereby incorporated by reference in their entirety.

TECHNICAL FIELD

The present invention relates to a welding method and a welding apparatus for a secondary battery and, more specifically, to: a welding method and a welding apparatus for a secondary battery, in which a laser beam is used to weld an electrode tab of an electrode assembly to a lower can, wherein the welding is performed by emitting the laser beam to the inside of the lower can, more specifically, emitting the laser beam such that defocusing is made, thereby preventing deformation in the exterior of the lower can and increasing welding strength and welding efficiency; and a monitoring method and a monitoring apparatus for a secondary battery welding process, capable of checking and monitoring a welded state when the welding is performed.

BACKGROUND ART

Generally, button-type batteries called as coin-type batteries and stud-type batteries have a thin stud or button shape and have been widely used in various devices such as remote controllers, watches, toys, and computer components.

Such a button-type battery was mainly manufactured as a non-rechargeable primary battery, but has also been widely manufactured as a chargeable and dischargeable secondary battery as miniaturized devices have been developed recently.

Also, like a cylindrical or pouch-type secondary battery, the button-type secondary battery has a repeatedly chargeable and dischargeable structure in which an electrode assembly and an electrolyte are embedded within a case.

In particular, the button-type secondary battery is different from the cylindrical secondary battery in that the structure is more simple and the height of a can is very small, but has a similar structure as the cylindrical secondary battery in that a jelly-roll type electrode assembly is mounted inside a can made of metal.

Meanwhile, the button-type secondary battery is manufactured in a manner in which the electrode assembly is embedded in a can formed by coupling an upper can and a lower can.

The electrode assembly is manufactured by being wound on a winding core in a state in which a separator, a negative electrode, a separator, and a positive electrode are stacked. Thus, it has a structure in which a center hole is formed at the center after the winding core is removed, and an electrode tab is manufactured to protrude upward and downward, respectively. Generally, when the electrode tab is seated on the lower can, an electrode tab positioned on an upper side is a positive electrode tab, and an electrode tab positioned on a lower side is a negative electrode tab. That is, when the electrode assembly is embedded, the upper can and the lower can are coupled, sealed, and electrically insulated. Thus, the upper can is connected to a positive electrode tab and serves as a positive electrode, and the lower can is connected to a negative electrode tab and serves as a negative electrode.

Meanwhile, as shown in FIG. 1 showing a state in which an electrode tab is welded to a lower can in a manufacturing process for a button-type secondary battery of the related art, the welding of a negative electrode tab among electrode tabs 2a of the related art is performed in a manner in which, in a state in which an electrode assembly 2 is mounted to a lower can 3 such that the electrode tab is positioned in a center hole 2b, a jig 1 is brought into close contact with an inner bottom surface of the lower can 3 through the center hole 2b, and then, the lower can 3 is turned upside down and irradiated with a laser beam from the outside.

However, in the foregoing method in which the welding is performed from the outside, the bonding is made as the lower can 3 relatively greater than the negative electrode tab is melted. Thus, laser welding may be limited according to the material properties and thickness of the lower can 3, and the commercial value thereof may deteriorate because there are welding traces left on the outer surface of the lower can 3.

In addition, while the welding is performed, it is required to check and monitor whether or not proper welding is performed.

DISCLOSURE OF THE INVENTION

Technical Problem

Thus, to solve the problems of the related art as described above, the main object of the present invention is to provide a welding method and a welding apparatus for a secondary battery, in which a laser beam is emitted to the inside of a lower can.

Also, another object is to provide a monitoring method and a monitoring apparatus for a secondary battery welding process, capable of checking a welded state after welding is completed or while welding is performed.

Technical Solution

To achieve the above-described objects, the present invention provides a welding apparatus and a welding method for welding an electrode tab (among a positive electrode tab and a negative electrode tab, particularly, the negative electrode tab) to a bottom surface of a lower can, and a monitoring method and a monitoring apparatus for a secondary battery welding process, capable of monitoring welding when the welding is performed.

A welding apparatus according to the present invention is a welding apparatus for a secondary battery, wherein when an electrode assembly having a center hole is seated on a lower can, an electrode tab of the electrode assembly is welded to an inner bottom surface of the lower can by the welding apparatus, the welding apparatus comprising: a jig which comprises an insertion portion that has a pipe shape and a diameter enabling entry into the center hole of the electrode assembly and a seating portion that has an enlarged diameter to form a disk shape on an end of the insertion portion; and a laser irradiation apparatus configured to emit a laser beam into a hole of the insertion portion, wherein in a state in which the electrode assembly is seated on the lower can such that the electrode tab is placed within the center hole, welding is performed as the laser beam is emitted to a contact point between the inner bottom surface of the lower can and the electrode tab after passing through the hole of the insertion portion of the jig.

The lower can has a cylindrical shape of which a lower side is closed by the inner bottom surface and a top side is open, and the seating portion has a diameter greater than a diameter of the lower can so that the seating portion is seated above the lower can when the insertion portion is inserted into the center hole of the electrode assembly mounted to the lower can.

When the seating portion is seated above the lower can as the insertion portion of the jig brings the electrode tab into close contact with the inner bottom surface of the lower can, a height (h) of the insertion portion is 5 mm or less, and an inner diameter of the hole formed in the insertion portion is in a range from 0.25 to 1.5 mm.

More specifically, a height (h) of the insertion portion is 5 mm or less, and an inner diameter of the hole formed in the insertion portion is in a range from 0.53 to 1.5 mm.

Also, a height (h) and a diameter (d) of the lower can are determined so that a value obtained by dividing the height (h) by the diameter (d) is in a range from 0.35 to 0.6.

The hole formed along a longitudinal direction of the insertion portion has a shape in which a diameter is greatest on a side, in which the seating portion is formed, and decreases gradually in a direction away therefrom.

The seating portion has a shape which has a relatively greater height at an edge portion and becomes gradually lower in a direction toward a hole of the center.

The seating portion has a recessed groove on a side surface so that an upper end of the lower can is inserted therein when the insertion portion enters the center hole.

The insertion portion has a length enabling the electrode tab to come into close contact with the inner bottom surface of the lower can when the insertion portion enters the center hole.

The jig is made of a metal material, and a bottom surface of the seating portion facing the electrode assembly and a surface of the insertion portion are coated with an insulating layer for insulating electricity.

Here, the insulating layer is made of a material having lower thermal conductivity than the jig.

Meanwhile, the laser beam is emitted in a defocusing state in which a focus is formed before the laser beam arrives at the contact point between the inner bottom surface of the lower can and the electrode tab.

Also, a welding method according to the present invention is a welding method for a secondary battery, wherein when an electrode assembly having a center hole is seated on a lower can, an electrode tab of the electrode assembly is welded to an inner bottom surface of the lower can through the welding method, the welding method comprising: an electrode assembly seating process of seating the electrode assembly on the lower can such that the electrode tab is placed within the center hole of the electrode assembly; a jig seating process of seating a jig, which comprises a seating portion having a disk shape and an insertion portion extending vertically from the seating portion and having a pipe shape, above the electrode assembly so that the insertion portion enters the center hole; and a welding process of emitting a laser beam into a hole inside the insertion portion and welding the electrode tab to the inner bottom surface of the lower can.

The laser beam emitted during the welding process is a pulse laser beam having an IR wavelength.

An end of the insertion portion during the jig seating process brings the electrode tab into close contact with the inner bottom surface of the lower can.

When the seating portion is seated above the lower can as the insertion portion of the jig brings the electrode tab into close contact with the inner bottom surface of the lower can, a height (h) of the insertion portion is 5 mm or less, and an inner diameter of the hole formed in the insertion portion is in a range from 0.25 mm to 1.5 mm and, more specifically, a range from 0.53 mm to 1.5 mm, and the inner bottom surface of the lower can and the electrode tab are welded during the welding process such that a welding region is formed at one point.

A height (h) and a diameter (d) of the lower can are determined so that a value obtained by dividing the height (h) by the diameter (d) is in a range from 0.35 to 0.6.

During the welding process, the laser beam is emitted in a defocusing state in which a focus is formed before the laser beam arrives at a contact point between the inner bottom surface of the lower can and the electrode tab.

Here, during the welding process, the focus of the laser beam is formed between a one-third point and a two-thirds point within the uppermost end and the lowermost end of the insertion portion. Also, in this case, the laser beam emitted during the welding process is one of quasi continuous wave laser, pulse laser, or CW modulation laser.

A monitoring apparatus for a welding process according to the present invention is a monitoring apparatus for a secondary battery welding process in which when an electrode assembly having a center hole is seated on a lower can, an electrode tab of the electrode assembly is welded to the lower can, the monitoring apparatus comprising a jig provided with an insertion portion that has a pipe shape and a diameter enabling entry into the center hole of the electrode assembly, and a laser irradiation apparatus configured to emit a laser beam into a hole of the insertion portion, wherein the laser irradiation apparatus comprises: a welding laser irradiation device configured to emit a welding laser beam into the hole of the insertion portion via a focusing lens to weld a contact point between the electrode tab and the lower can in a state in which the electrode assembly is seated inside the lower can such that the electrode tab is placed within the center hole; an illumination laser irradiation device configured to emit an illumination laser beam into the hole of the insertion portion via the focusing lens; and an image sensor configured to receive the reflected illumination laser beam, wherein the welding laser beam and the illumination laser beam are emitted vertically from a top side of the center hole.

The welding laser beam is reflected from a first dichroic mirror and passes through the focusing lens, and the illumination laser beam is reflected from a second dichroic mirror and passes through the focusing lens.

Each of the first dichroic mirror and the second dichroic mirror is set such that a portion of the laser beam is reflected therefrom, and another portion is transmitted therethrough, wherein the welding laser beam is reflected from the first dichroic mirror and emitted to the focusing lens, and the illumination laser beam is transmitted through the first dichroic mirror and emitted to the focusing lens.

A light source of the illumination laser beam, which is reflected from a welding point, is transmitted through the first dichroic mirror and then transmitted through the second dichroic mirror, and arrives at the image sensor.

The welding laser irradiation device comprises: a welding laser oscillator configured to emit the welding laser beam; a first optical insulator configured such that the welding laser beam emitted from the welding laser oscillator is allowed to pass therethrough when moving in a forward direction, but is blocked when returning; and a first collimator configured such that the welding laser beam, which has passed through the first optical insulator, is made parallel after passing therethrough.

The illumination laser irradiation device comprises: an illumination laser oscillator configured to emit the illumination laser beam; a second optical insulator configured such that the illumination laser beam emitted from the illumination laser oscillator is allowed to pass therethrough when moving in a forward direction, but is blocked when returning; and a second collimator configured such that the illumination laser beam, which has passed through the second optical insulator, is made parallel after passing therethrough.

The illumination laser beam passes through the focusing lens and has a diameter smaller than an inner diameter of the hole of the insertion portion.

The emission of the illumination laser beam stops when the welding laser beam is emitted, and the emission of the welding laser beam stops when the illumination laser beam is emitted.

The jig is provided with a seating portion that has an enlarged diameter to form a disk shape on an end of the insertion portion.

A monitoring method for a welding process according to the present invention is a monitoring method for a secondary battery welding process in which when an electrode assembly having a center hole is seated on a lower can, an electrode tab of the electrode assembly is welded to the lower can, the monitoring method comprising: an electrode assembly seating process of seating the electrode assembly on the lower can such that the electrode tab is placed within the center hole; a jig seating process of seating a jig, which comprises an insertion portion having a pipe shape, so that the insertion portion enters the center hole; and a welding process of emitting a welding laser beam to the hole of the insertion portion via a focusing lens to weld a contact point between the electrode tab and the lower can; and a sensing process of receiving, with an image sensor, an illumination laser beam which is emitted into the hole of the insertion portion via the focusing lens and then reflected, wherein the welding laser beam and the illumination laser beam are emitted vertically from a top side of the center hole.

Another monitoring method for a secondary battery welding process provided in the present invention is a monitoring method for a secondary battery welding process in which when an electrode assembly having a center hole is seated on a lower can, an electrode tab of the electrode assembly is welded to the lower can, the monitoring method comprising: an electrode assembly seating process of seating the electrode assembly on the lower can such that the electrode tab is placed within the center hole; a jig seating process of seating a jig, which comprises an insertion portion having a pipe shape, so that the insertion portion enters the center hole; and a welding process of emitting a laser beam to the hole of the insertion portion via a focusing lens to weld a contact point between the electrode tab and the lower can; and a sensing process of receiving, with an image sensor, the laser beam reflected from a welding point, wherein during the sensing process, the laser beam is emitted to the hole of the insertion portion after an output thereof is adjusted, and the image sensor receives the reflected laser beam.

Advantageous Effects

In the present invention having the above configurations, the electrode tab (negative electrode tab) is welded by emitting the laser beam to the inside of the lower can. Thus, there is no welding trace left on the lower can, and accordingly, the commercial value may be enhanced.

The seating portion of the jig is seated above the lower can, and thus, the laser beam may be stably emitted. Also, it is possible to prevent foreign substances generated during the welding from entering the electrode assembly, and it is possible to prevent the effect of damage that may be caused by heat due to laser irradiation. Also, when the seating portion is seated on the insertion portion, the movement of the insertion portion is regulated. Thus, the welding may be stably performed. More specifically, in the jig of the present application, the seating portion is formed larger than the diameter of the lower can, and thus, the influence by a spatter may be suppressed. That is, the spatter is highly likely to occur during welding due to the characteristics of laser welding. This spatter represents that the lower can and the electrode tab are melted and scattered in the form of metal particles, and may penetrate into the electrode assembly. Also, these metal particles move inside the electrode assembly and may cause a short circuit. The jig of the present application is provided to prevent penetration of these metal particles. As the seating portion has a larger diameter than the lower can, the penetration of metal particles may be efficiently prevented.

In the present invention, the inner diameter of the hole of the insertion portion may vary according to the number of points at which the welding is performed, and accordingly, the volume of the electrode assembly within the lower can may be maximized.

For example, in case where the welding point is at one place, when the inner diameter of the hole formed in the insertion portion is limited to a range from 0.25 to 1.5 mm, the volume of the electrode assembly may increase to around 100% of the inner volume of the lower can, and thus, the charge and discharge capacity may be enhanced. On the other hand, in case where the welding points are at three places, the inner diameter of the hole is limited to a range from 0.53 to 1.5 mm (due to an increase in the diameter of the center hole of the electrode assembly), and the volume of the electrode assembly is reduced. Accordingly, the volume of the electrode assembly is reduced to 97% of the inner volume of the lower can, but the welding strength may be enhanced.

In the jig provided in the present invention, the hole formed along a longitudinal direction of the insertion portion has a shape in which a diameter is greatest on a side, in which the seating portion is formed, and decreases gradually in a direction away therefrom. Thus, the range of points to be welded may be precisely limited.

Also, the seating portion of the jig has a shape which has a relatively greater height at an edge portion and becomes gradually lower in a direction toward a hole of the center. Thus, gases supplied together during laser welding may be easily discharged.

In addition, the seating portion has a recessed groove on a side surface so that the upper end of the lower can is inserted into the bottom surface of the seating portion when the insertion portion of the jig enters the center hole. Thus, the welding is stably performed in a state in which the jig is fixed.

Also, the bottom surface of the seating portion and the surface of the insertion portion are coated with an insulating layer for insulating electricity. Thus, the electrode assembly may be protected from the heat generated while the laser beam is emitted.

Also, in the present invention, the laser beam is emitted in a defocusing state so that the focus is formed within the inner hole formed in the insertion portion of the jig, and thus, the maximum inner diameter of the laser beam entering the jig may be reduced. Accordingly, the diameter of the jig, particularly, the insertion portion may be reduced, but the volume of the electrode assembly may increase (by reducing the inner diameter of the center hole of the electrode assembly). Thus, the capacity of the secondary battery may be enhanced. Also, as the laser beam is emitted in a defocusing state, the occurrence of spatter may be more efficiently suppressed and minimized. That is, the areas at the points at which the laser beams arrive and the temperatures of the points to be welded may be adjusted through the defocusing. Thus, the occurrence of the spatter may be suppressed or minimized by adjusting the height of the focus depending on welding conditions.

In the present invention, when the defocusing of the laser beam is made, the focus is formed between a one-third point and a two-thirds point within the uppermost end and the lowermost end of the insertion portion. Thus, the diameter on the transverse section of the laser beam may be minimized.

In the present invention, when the electrode tab is welded, the illumination laser beam is emitted vertically like the welding laser beam. Thus, the welded state may be more clearly checked and monitored. That is, the illumination laser beam is emitted vertically, and thus, a shaded area does not occur.

In addition, in the present invention, the welding laser beam may be used as the illumination laser beam by adjusting the output of the welding laser irradiation device without using a separate illumination laser irradiation device. Thus, the welding apparatus may be manufactured in a more compact size, and the structure thereof may be simplified.

BRIEF DESCRIPTION OF THE DRAWINGS

FIG. 3 is a perspective view showing a state in which a lower can, an electrode assembly, and a jig are exploded.

MODE FOR CARRYING OUT THE INVENTION

Figure 1:
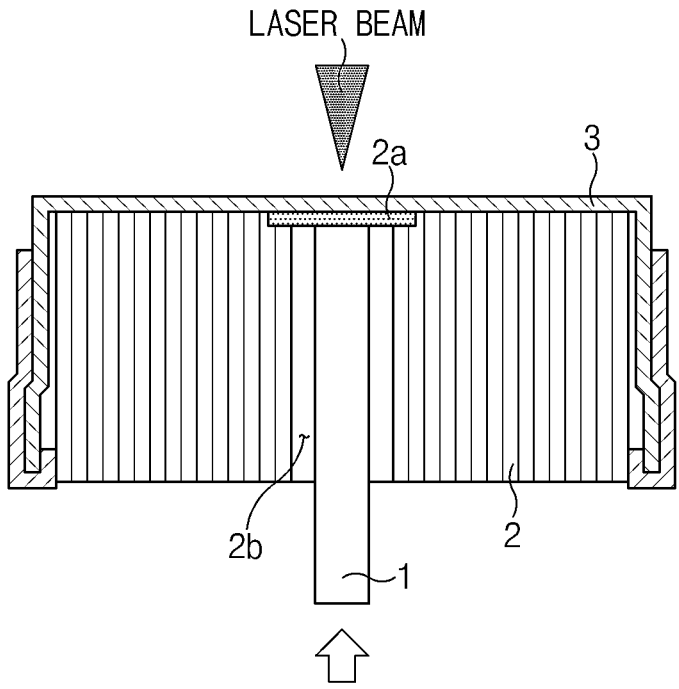
FIG. 1 is a cross-sectional view showing a state in which an electrode tab is welded to a lower can by emitting a laser beam from the outside during a button-type secondary battery assembly process according to the related art.

Hereinafter, embodiments of the present invention will be described in detail with reference to the accompanying drawings so that those skilled in the art can easily carry out the present invention. However, the present invention may be embodied in various different forms, and is not limited to the embodiments described herein.

A part irrelevant to the description will be omitted to clearly describe the present invention, and the same or similar elements will be designated by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a welding method and a welding apparatus for a secondary battery, capable of increasing efficiency of a welding process by emitting a laser beam to the inside (the side to which an electrode assembly is mounted) of a lower can 3 without a welding trace left on the exterior of the lower can. Also, the present invention relates to a method and apparatus for monitoring a welded state when a welding process for a secondary battery is performed. Hereinafter, embodiments of the present invention will be described in more detail with reference to the accompanying drawings.

First Embodiment

In the embodiment, provided are a welding method and a welding apparatus, in which welding is performed by emitting a laser beam to the inside of a lower can 3.

The welding method provided in the present invention is a welding method in which when an electrode assembly 2 having a center hole 2*b* is seated on a lower can 3, an electrode tab 2a (here, the electrode tab is a negative electrode tab) of the electrode assembly 2 is welded to an inner bottom surface of the lower can 3. The welding method comprises an electrode assembly seating process, a jig seating process, and a welding process.

Figure 2:
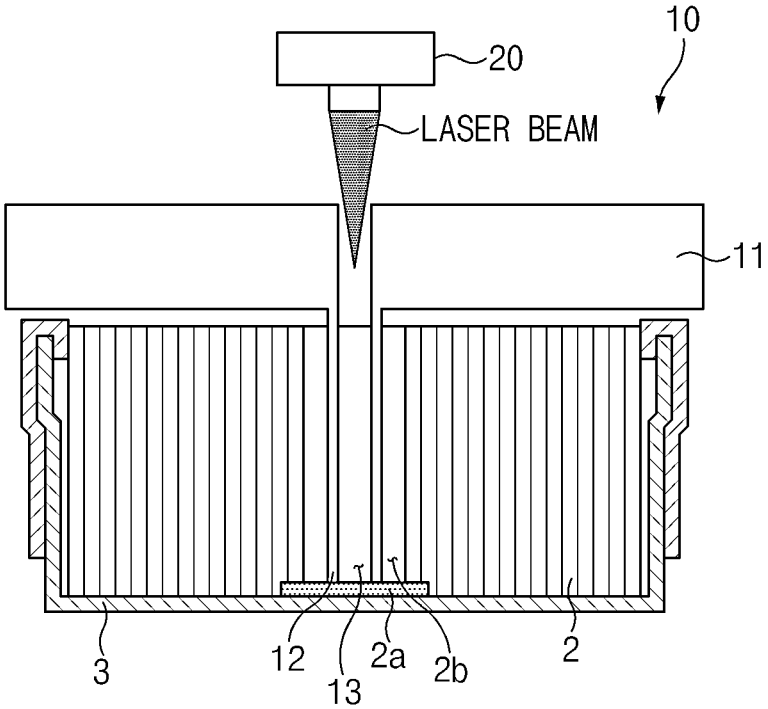
FIG. 2 is a cross-sectional view showing a state in which an electrode tab (a negative electrode tab among electrode tabs) is welded to a lower can by emitting a laser beam into the lower can in a button-type secondary battery assembly process according to a first embodiment of the present invention.

FIG. 2 is a cross-sectional view showing a state in which the electrode tab 2a is welded to the lower can 3 by emitting the laser beam into the lower can 3 in a button-type secondary battery assembly process according to the present invention, and FIG. 3 is a perspective view showing a state in which the lower can 3, the electrode assembly 2, and the jig are exploded.

During the electrode assembly seating process, the electrode assembly 2 is seated on the inside of the lower can 3. The electrode assembly 2 is manufactured by being wound on a winding core in a state in which a separator, a negative electrode, a separator, and a positive electrode are stacked as in a structure of the related art, and thus has a structure in which the center hole 2b is formed at the center after the winding core is removed. Also, the electrode tabs are manufactured to protrude upward and downward, respectively (a positive electrode tab on the upper side and a negative electrode tab on the lower side).

Thus, the electrode assembly 2 is mounted to the lower can 3 such that the negative electrode tab positioned on the lower side comes into contact with the inner bottom surface of the lower can 3. When the electrode assembly 2 is seated on the lower can 3, the electrode tab 2a, which is a negative electrode tab, is seated so as to be positioned within the center hole 2b of the electrode assembly 2.

Then, the jig seating process is performed in a state in which the electrode assembly 2 is seated on the lower can 3. The jig 10 provided in the embodiment comprises a seating portion 11 having a disk shape and an insertion portion 12 extending vertically from the center of the seating portion 11 and having a pipe shape. A hole 13 formed inside the insertion portion 12 along the longitudinal direction has a vertically open structure that passes through the seating portion 11 and the insertion portion 12.

The jig 10 is seated from the top to the bottom of the electrode assembly 2, and the insertion portion 12 enters the center hole 2b of the electrode assembly 2. The seating portion 11 of the jig 10 has the diameter larger than the diameter of the lower can 3 and is thus rested above the upper end of the lower can 3. Here, the end of the insertion portion 12 brings the negative electrode tab into close contact with the inner bottom surface of the lower can 3.

Also, in a state in which the jig 10 is seated on the lower can 3, the welding process is performed in which the laser beam is emitted to the inside of the insertion portion 12 via the hole 13 to weld the electrode tab to the inner bottom surface of the lower can 3.

Figure 5:
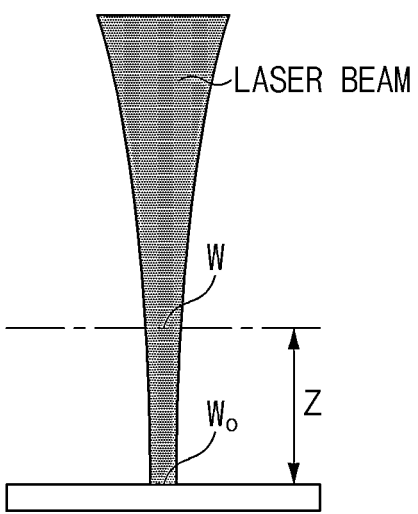
FIG. 5 is an enlarged view showing a state in which a laser beam is emitted to an electrode tab.

Here, the emitted laser beam may be a pulse laser beam having an IR wavelength, and the IR wavelength may be 1060 nm to 1080 nm, preferably, 1070 nm (to have a shape illustrated in FIG. 5).

Figure 4:
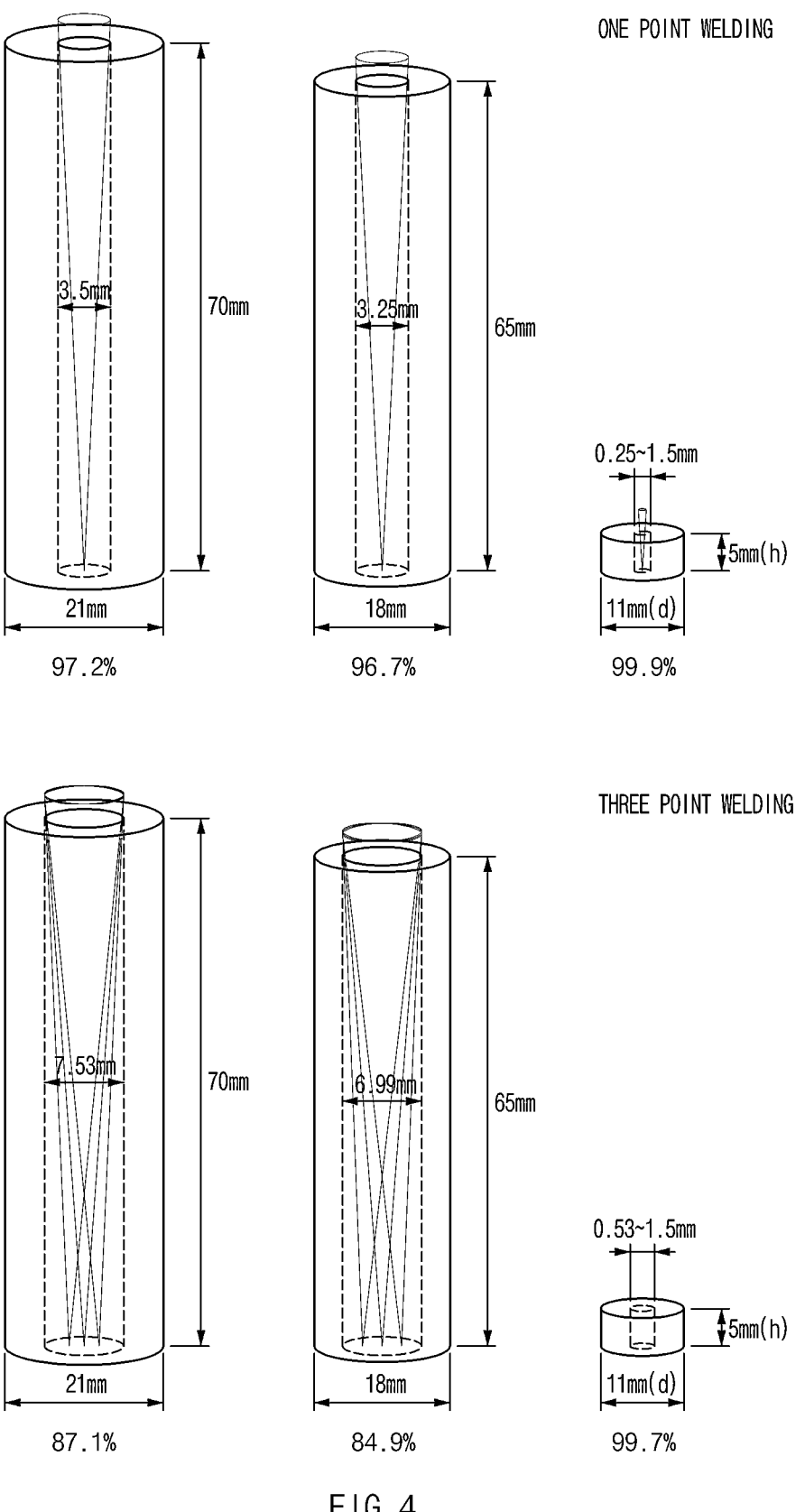
FIG. 4 is a see-through view showing candles of cylindrical batteries having relatively larger height and diameter and a lower can of a button-type battery of the present invention, and the inner diameter of a hole formed in a jig required during one point welding and the inner diameter of a hole formed in a jig required during multiple point welding are illustrated.

FIG. 4 is a see-through view showing candles of cylindrical batteries having relatively larger height and diameter (two on the left side except for one on the right side in FIG. 4) and the lower can 3 of the button-type battery of the present invention, and the inner diameter of the hole 13 formed in the jig 10 required during one point welding and the inner diameter of the hole 13 formed in the jig required during multiple point welding are illustrated.

Referring to FIG. 4, the laser beam emitted in the present invention is emitted such that the diameter of the laser beam on the transverse section is smallest at a focus (converged at the focus), and is emitted such that the focus is formed at the electrode tab (negative electrode tab).

Thus, the diameter of the laser beam on the transverse section increases gradually in a direction away from the electrode tab. For example, when the one point welding is performed in FIG. 4, in case where laser beams having the same standard are emitted, the candles of a cylindrical battery (a battery of 18650 standard) having the height of 65 mm and a cylindrical battery (a battery of 21700 standard) having the height of 70 mm require holes having the inner diameters of 3.25 mm and 3.5 mm, respectively.

Here, the outer diameter of the battery can of 18650 standard is 18 mm, and the outer diameter of the battery can of 21700 standard is 21 mm. The hole through which the laser beam passes serves as the center hole of the electrode assembly (or the inner diameter of the hole formed in the jig when the jig is inserted). The center hole has to be manufactured in a cylindrical shape due to a limitation of a manufacturing method, and thus, there is a limitation in increasing the capacity of the electrode assembly by reducing the diameter of the center hole so as to avoid laser interference. Thus, the volumes of the battery of 18650 standard and the battery of 21700 standard are reduced as much as the volumes of the center holes through which the laser beams pass, and thus, the size of the maximum volumes are limited to 96.7% and 97.2%, respectively, when compared to the volumes when the center holes are not formed.

On the other hand, when the lower can 3 of the button-type battery of the present application has a height h of 5 mm and a diameter d (an outer diameter) of 11 mm, the inner diameter of the hole 13 through which the laser beam passes requires 0.25 mm to 1.5 mm. This means that the size of the inner diameter of the insertion portion 21 of the jig requires 0.25 mm to 1.5 mm.

That is, in the present invention, the inner diameter of the hole 13 required as reducing the height of the lower can may be remarkably reduced, compared to when the can having the large height is welded. Thus, the inner diameter of the center hole 2b formed in the electrode assembly 2 may be reduced, and thus, the volume of the electrode assembly 2 may increase to 98.1% to 99.9% of the volume, compared to the volume when the center hole 2b is not formed.

An object of the present invention is to determine the size of the inner diameter of the insertion portion 12 of the jig so that the volume of a portion producing energy may increase to 98.1% to 99.9%, and thus, the thickness of the insertion portion may be considered sufficiently thin.

Particularly, when the multiple point welding is performed by moving a focus of a laser beam, the center hole of the electrode assembly has to have a larger diameter. For example, when the battery of 18650 standard and the battery of 21700 standard are subjected to the multiple point welding, the inner diameters of the holes have to increase from 3.25 mm to 6.99 mm and from 3.5 mm to 7.53 mm, respectively. In this case, the volumes are limited to 84.9% and 87.1%, respectively, compared to the volumes when the center holes are not formed.

However, in the structure of the present application, the lower limit of the diameter of the hole increases from 0.25 mm to 0.53 mm even when the multiple point welding is performed. Even in this case, 98.1% to 99.7% of the volume may be ensured compared to the volume when the center hole is not formed.

This is because the outer line of the laser beam is emitted in a curved line as shown in FIG. 5 that illustrates an enlarged state in which the laser beam is emitted to the electrode tab. That is, for the transverse section Wo of the laser beam emitted to the electrode tab 2a, a transverse section W does not sharply increase to a certain height Z, but the transverse section is formed larger above the certain height. Thus, the diameter of the hole through which the laser beam is emitted has to increase more according to the height of a can or the lower can 3.

Thus, in the present invention, the size of the jig 10 is limited to a certain range of size so as to prevent damages of the electrode assembly and the jig and prevent interference of the laser beam.

That is, in case where the inner bottom surface of the lower can 3 and the electrode tab 2a are welded such that the welding region therebetween is formed at one point during the welding process (when one point welding is performed), when the seating portion 11 is seated above the lower can 3 while the insertion portion 12 of the jig brings the electrode tab 2a into close contact with the inner bottom surface of the lower can 3, the height h of the insertion portion is 5 mm or less, and the inner diameter of the hole 13 formed in the insertion portion is 0.25 mm to 1.5 mm.

Also, in case where the inner bottom surface of the lower can 3 and the electrode tab 2a are welded such that the welding regions therebetween are formed at three points during the welding process (when multiple point welding is performed), when the seating portion 11 is seated above the lower can 3 while the insertion portion 12 of the jig 10 brings the electrode tab 2a into close contact with the inner bottom surface of the lower can 3, the height h of the insertion portion is 5 mm or less, and the inner diameter of the hole 13 formed in the insertion portion 12 is 0.53 mm to 1.5 mm.

TABLE 1

| | Diameter of insertion portion (mm) | | | | | | |
|---|---|---|---|---|---|---|---|
| | 0.25 | 0.50 | 0.75 | 1.00 | 1.25 | 1.50 | 2.0 |
| Usable volume (%) | 99.9 | 99.7 | 99.5 | 99.1 | 98.7 | 98.1 | 96.7 |

(In case where one point welding is performed when the lower can has the diameter of 11 mm and the height of 5 mm)

TABLE 2

| | Diameter of insertion portion (mm) | | | | |
|---|---|---|---|---|---|
| | 0.53 | 1.0 | 1.5 | 2.00 | 2.5 |
| Usable volume (%) | 99.7 | 99.1 | 98.1 | 96.7 | 94.8 |

(In case where multiple point welding is performed when the lower can has the diameter of 11 mm and the height of 5 mm)

Referring to Tables 1 and 2 above, in case where one point welding is performed when the lower can according to the present invention has the height of 11 mm and the height of 5 mm, the minimum inner diameter of the hole 13 of the insertion portion 12 may be determined as 0.25 mm. In this case, when less than 0.25 mm, there is interference between the laser beam and the jig 10, and the welding may be impossible. Thus, the maximum value of the usable volume for one point welding may be obtained as 99.9% when the diameter is 0.25 mm.

In addition, when the multiple point welding is performed, the minimum inner diameter of the hole 13 of the insertion portion 12 may be determined as 0.53 mm. Even in this case, when less than 0.53 mm, there is interference between the laser beam and the jig 10, and the welding may be impossible. Thus, the maximum value of the usable volume for multiple point welding may be obtained as 99.7% when the diameter is 0.53 mm.

Meanwhile, in order to satisfy a mass production criteria that is a criteria where a significant difference occurs in the button-type secondary battery, the minimum usable volume within the lower can 3 has to be 98% or higher.

When referring to Table 1 for the one point welding, the usable volume is 98.1% when the inner diameter of the hole 13 is 1.5 mm, but is sharply reduced to less than 98%, i.e., 96.7% when exceeding this inner diameter. Thus, in the welding method according to the present invention, the inner diameter of the hole formed in the insertion portion needs to be restricted to a range from 0.25 to 1.5 mm for the one point welding.

Also, even when referring to Table 2 for the multiple point welding, the usable volume is 98.1% when the inner diameter of the hole is 1.5 mm, but is sharply reduced to less than 98%, i.e., 96.7% when exceeding this inner diameter. Thus, in the welding method according to the present invention, the inner diameter of the hole formed in the insertion portion needs to be limited to a range from 0.53 to 1.5 mm for the multiple point welding.

Meanwhile, in the lower can provided in the present invention, a height h and a diameter d are determined such that a value (that is, h/d) obtained by dividing the height h by the diameter d has a range from 0.35 to 0.6. For example, when the diameter is 11 mm and the height is 5, the value is 0.45 and satisfies the above range. Within this ratio range, the most efficient battery may be embodied.

In addition, the embodiment further provides a welding apparatus for a secondary battery, in which when the electrode assembly 2 having the center hole 2b is seated on the lower can 3, the electrode tab 2a of the electrode assembly 2 is welded to the inner bottom surface of the lower can 3.

Referring to the drawings, the welding apparatus of the present invention comprises the jig 20 and a laser irradiation apparatus 20.

The jig 10 is provided with the insertion portion 12 that has a pipe shape and a diameter enabling entry into the center hole 2b of the electrode assembly 2 and the seating portion 11 that has an enlarged diameter to form a disk shape on an end of the insertion portion 12. The seating portion 11 has a larger diameter than the lower can 3, and the insertion portion 12 has a length enabling the electrode tab 2a to press the inner bottom surface of the lower can 3 in the center hole 2b of the electrode assembly 2 when the seating portion 12 is seated above the upper end of the lower can 3. Also, the hole 13 formed inside the insertion portion 12 is configured to be vertically open as passing through the seating portion 11.

Also, the laser irradiation apparatus 20 is configured to emit a laser beam to the hole 13 of the insertion portion 12, and the laser beam is emitted such that a focus is formed at the electrode tab 2a.

Thus, in a state in which the electrode assembly 2 is seated on the lower can 3 such that the electrode tab 2a is placed within the center hole 2b, the welding is performed as the laser beam is emitted to a contact point between the inner bottom surface of the lower can 3 and the electrode tab 2a after passing through the insertion portion 12 of the jig 10.

Meanwhile, in the embodiment, the lower can 3 has a cylindrical shape of which a lower side is closed by the inner bottom surface and a top side is open.

Also, as described above, in order to suppress a volume loss of the electrode assembly 2 as much as possible, the jig 10 according to the embodiment is formed such that when the seating portion 11 is seated above the lower can 3 while the insertion portion 12 of the jig 10 brings the electrode tab 2a into close contact with the inner bottom surface of the lower can 3, the height h of the insertion portion is 5 mm or less, and the inner diameter of the hole formed in the insertion portion has a range from 0.25 mm to 1.5 mm.

Also, when the seating portion 11 is seated above the lower can 3 while the insertion portion 12 of the jig 10 brings the electrode tab 2a into close contact with the inner bottom surface of the lower can 3, the height h of the insertion portion is 5 mm or less, and the inner diameter of the hole formed in the insertion portion has a range from 0.53 mm to 1.5 mm (in case where a plurality of welding regions are formed).

Figure 6:
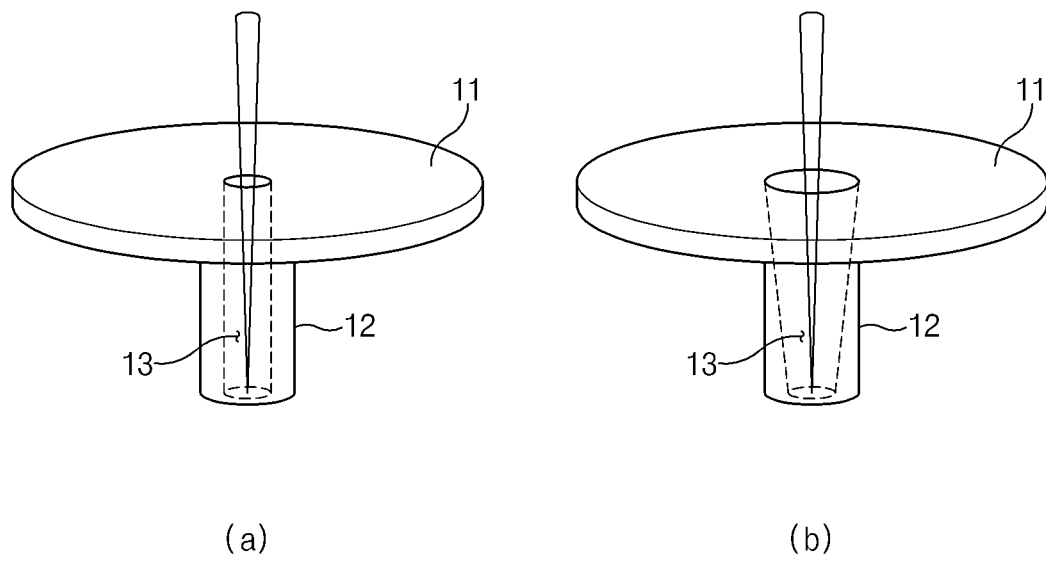
FIG. 6 is a view illustrating several modified examples of a jig according to the present invention.
Figure 6:
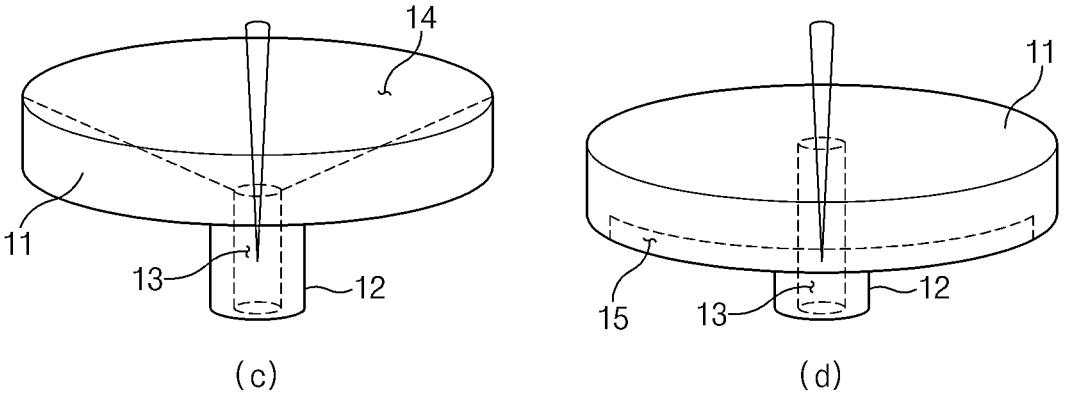

In addition, as shown in FIG. 6 that illustrates several modified examples of the jig 10 according to the present invention, the jig 10 provided in the embodiment may several additional structures in addition to a general structure (a) in which the circular plate-shaped seating portion 11 is coupled to the upper end of the cylindrical insertion portion 12.

That is, in the jig 10, the hole 13 formed along a longitudinal direction of the insertion portion 12 has a shape (b) in which a diameter is greatest on a side, in which the seating portion 12 is formed, and decreases gradually in a direction away therefrom.

Also, the seating portion 11 may have a shape (c) which has a relatively greater height at an edge portion and becomes gradually lower in a direction toward the hole 13 of the center, that is, a shape in which a wedge groove 14 is formed in the seating portion 11.

Also, the seating portion 11 may have a structure (d) in which a recessed groove 15 is formed on a side surface so that an upper end of the lower can 3 is inserted therein when the insertion portion 12 enters the center hole 2b.

The jig having a shape (b) may precisely limit a range of a point to be welded, the jig having a configuration (c) may facilitate a flow of gas provided together during laser welding, and the jig having a configuration (d) may stably perform welding while being fixed to the lower can 3.

Figure 7:
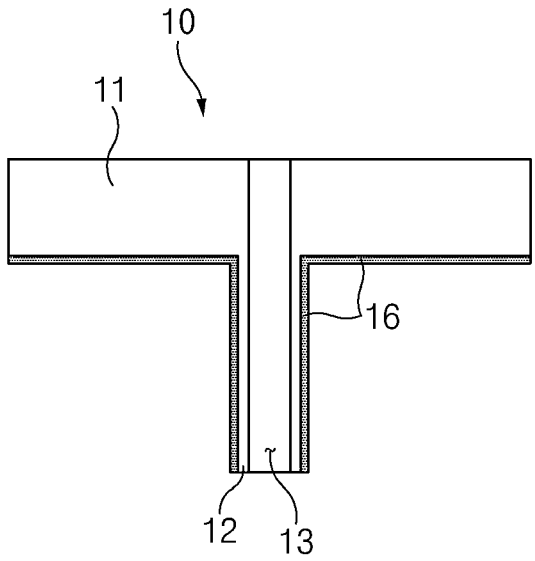
FIG. 7 is a longitudinal cross-sectional view of a jig in which a modified example of the present invention is applied.

FIG. 7 is a longitudinal cross-sectional view of a jig in which a modified example of the present invention is applied. In the jig 10 as illustrated in FIG. 7, a bottom surface of the seating portion 11 facing the electrode assembly 2 and a surface of the insertion portion 12 are coated with an insulating layer 16 for insulating electricity. The insulating layer 16 may be made of a material having lower thermal conductivity than the jig 10. Thus, when heat is generated due to welding, the heat to be transferred to the electrode assembly is blocked, thereby preventing degradation of the electrode assembly.

In the first embodiment of the present invention having the above configurations, the electrode tab (negative electrode tab) is welded by emitting the laser beam to the inside of the lower can. Thus, there is no welding trace left on the lower can 3, and accordingly, the commercial value may be enhanced.

The seating portion 12 of the jig 10 is seated above the lower can 3, and thus, the laser beam may be stably emitted. Also, it is possible to prevent foreign substances generated during the welding from entering the electrode assembly 2, and it is possible to prevent the effect of damage that may be caused by heat due to laser irradiation.

In the present invention, the inner diameter of the hole 13 of the insertion portion 12 may vary according to the number of points at which the welding is performed, and accordingly, the volume of the electrode assembly 2 within the lower can 3 may be maximized. For example, in case where the welding point is at one place, when the inner diameter of the hole 13 formed in the insertion portion 12 is limited from 0.25 to 1.5 mm, the volume of the electrode assembly 2 may increase to around 100% of the inner volume of the lower can 3, and thus, the charge and discharge capacity may be enhanced. On the other hand, in case where the welding points are at a plurality of places, the inner diameter of the hole 13 is limited to a range from 0.53 to 1.5 mm (due to an increase in the diameter of the center hole of the electrode assembly), and the volume of the electrode assembly is reduced. Accordingly, the volume of the electrode assembly is reduced to 97% of the inner volume of the lower can, but the welding strength may be enhanced.

In the jig 10 provided in the present invention, the hole formed along a longitudinal direction of the insertion portion 12 has a shape in which a diameter is greatest on a side, in which the seating portion is formed, and decreases gradually in a direction away therefrom. Thus, the range of points to be welded may be precisely limited.

Also, the seating portion of the jig has a shape which has a relatively greater height at an edge portion and becomes gradually lower in a direction toward a hole of the center. Thus, gases supplied together during laser welding may be easily discharged.

In addition, the seating portion has a recessed groove on a side surface so that the upper end of the lower can is inserted into the bottom surface of the seating portion when the insertion portion of the jig enters the center hole. Thus, the welding is stably performed in a state in which the jig is fixed.

Second Embodiment

In the embodiment, provided are a welding method and a welding apparatus, in which welding is performed by emitting a laser beam to the inside of a lower can 3 such that defocusing is made.

The welding method provided in the embodiment is a welding method for a secondary battery, in which when an electrode assembly 2 having a center hole 2b is seated on a lower can 3, an electrode tab 2a of the electrode assembly 2 is welded to an inner bottom surface of the lower can 3. As in the first embodiment, the welding method comprises an electrode assembly seating process, a jig seating process, and a welding process.

Figure 8:
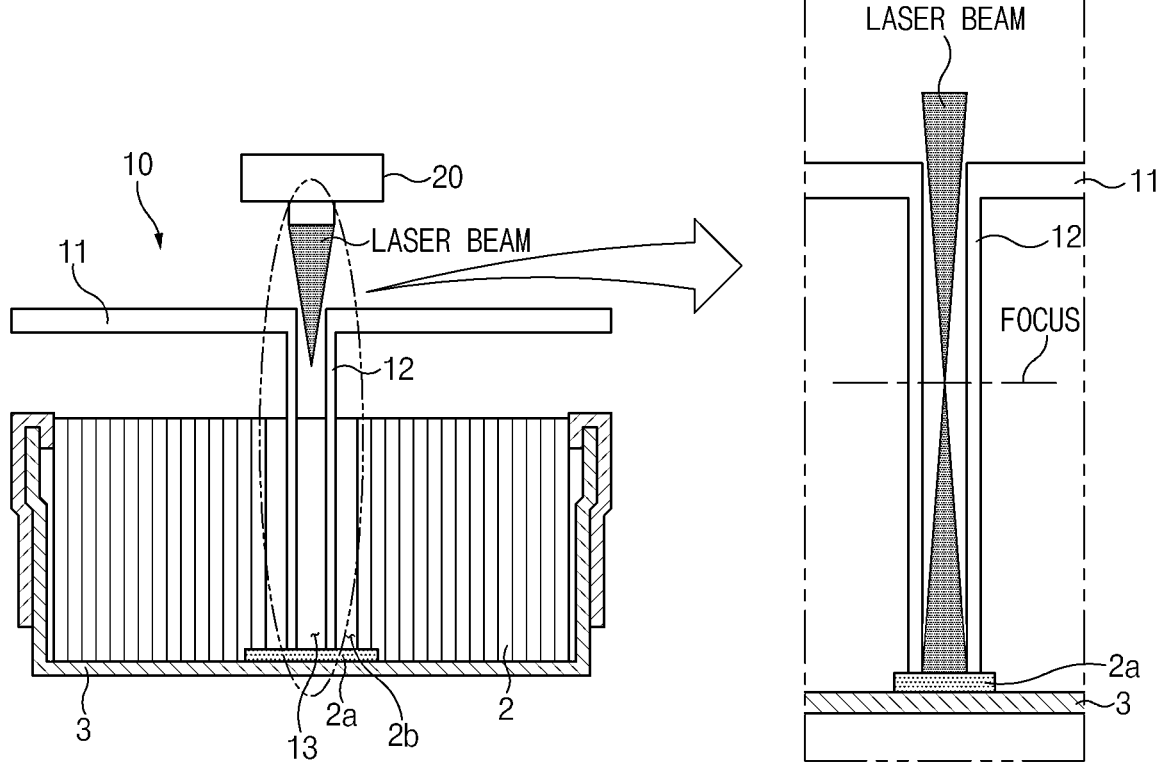
FIG. 8 is a view showing a state, in which an electrode tab (a negative electrode tab among electrode tabs) is welded to a lower can by emitting a laser beam into the lower can in a button-type secondary battery assembly process according to a second embodiment of the present invention, and a state, in which a focus is formed.
Figure 9:
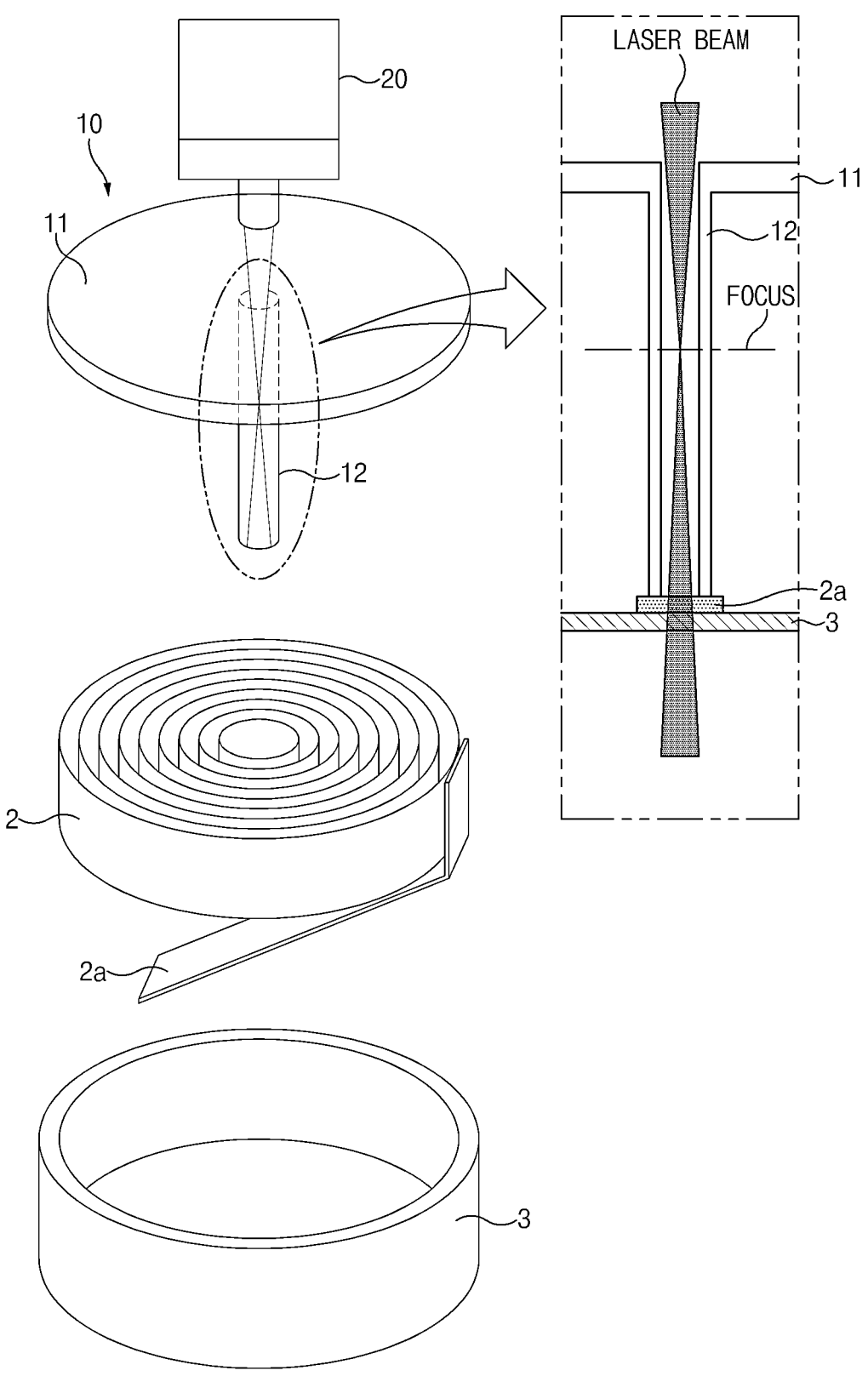
FIG. 9 is a view showing a state in which a lower can, an electrode assembly, and a jig are exploded in the button-type secondary battery assembly process according to a second embodiment.
Figure 10:
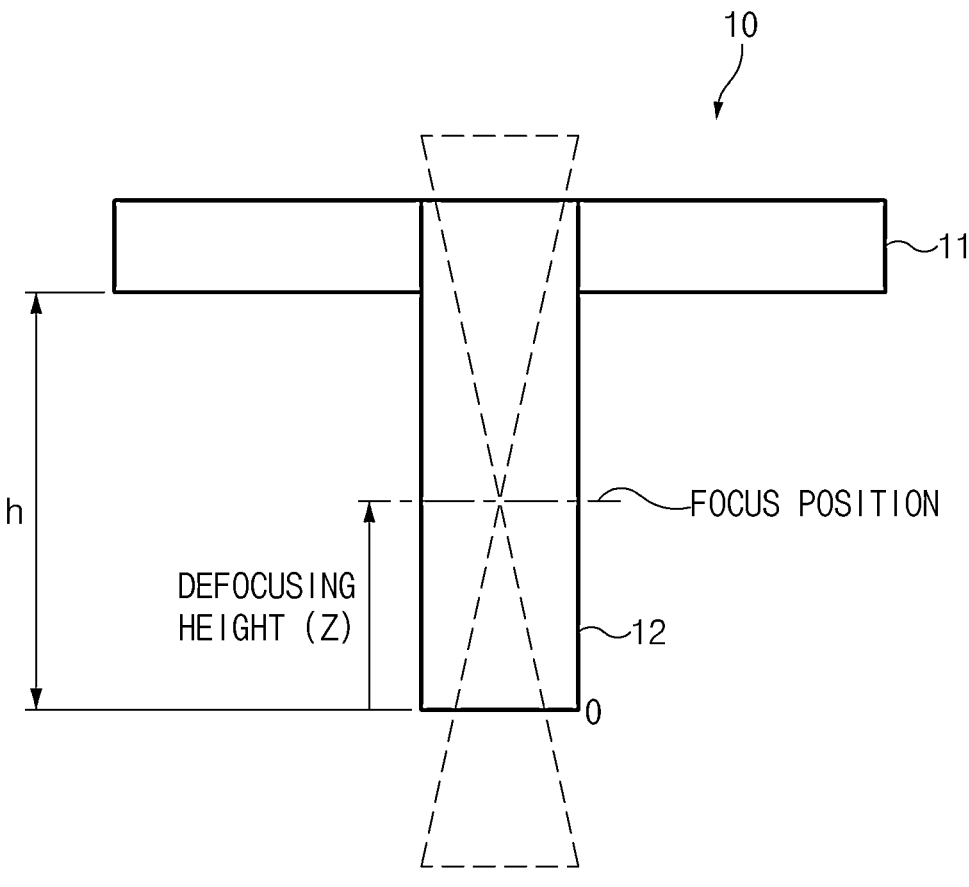
FIG. 10 is a view schematically illustrating a height z, at which a focus of a laser beam is formed, relative to a height h of an electrode assembly.

FIG. 8 is a view showing a state, in which the electrode tab (a negative electrode tab among the electrode tabs) is welded to the lower can by emitting the laser beam into the lower can in a button-type secondary battery assembly process according to the present invention, and a state, in which a focus is formed. FIG. 9 is a view showing a state in which the lower can, the electrode assembly, and the jig are exploded. FIG. 10 is a view schematically illustrating a height z, at which a focus of a laser beam is formed, relative to a height h of the electrode assembly.

Referring to the accompanying drawings, the electrode assembly seating process and the jig seating process are performed in the same manner as those in the first embodiment.

That is, the electrode assembly 2 is seated within the lower can 3 during the electrode assembly seating process, and the jig seating process is performed in a state in which the electrode assembly 2 is seated on the lower can 3.

A jig 10 provided in the embodiment may also have a structure identical or similar to that of the first embodiment. That is, provided is the jig 10 which comprises a seating portion 11 having a disk shape and an insertion portion 12 extending vertically from the center of the seating portion 11 and having a pipe shape. Here, a hole 13 of the insertion portion 12, which is formed along the longitudinal direction inside the insertion portion 12, has a vertically open structure that passes through the seating portion 11 and the insertion portion 12, and the jig 10 is seated above the electrode assembly such that the insertion portion 12 enters the center hole 2*b*.

Also, in a state in which the insertion portion 12 of the jig 10 enters the center hole 2*b*, the welding process is performed in which a laser beam is emitted via an inner hole 13 of the insertion portion 12 to weld the electrode tab 2*b* to the inner bottom surface of the lower can 3.

Here, the laser beam to be emitted may be one of quasi continuous wave laser, pulse laser, or CW modulation laser. In the quasi continuous wave laser, continuous wave laser, in which uninterrupted beams are continuously generated, or pulse laser, in which light emission itself continues only for a very short period of time, may be selected.

Among them, the quasi continuous wave laser may be used for welding between the electrode tab 2*a* and the lower can 3 because flexibility of outputs and laser wavelengths may be adjusted. Also, during the welding process (S30), the inner bottom surface of the lower can 3 and the electrode tab 2*a* may be welded to each other individually at a plurality of points.

Meanwhile, during the welding process provided in the embodiment, the laser beam is emitted in a defocusing state in which a focus is formed before the laser beam arrives at a contact point between the inner bottom surface of the lower can 3 and the electrode tab 2*a*.

That is, the laser beam emitted for welding is emitted such that the diameter on the transverse section is largest at a light emitting point and is smallest at the focus (converged at the focus). The laser beam is converged at the focus and then arrives at the welding point, i.e., the electrode tab 2*a* in a state in which the diameter gradually increases. Thus, the laser beam is emitted in a defocusing state so that the focus is formed within the jig before arriving at the electrode tab.

A dictionary meaning of the defocusing means that a focus is not accurately formed, and '+' defocusing represents a state in which a focus is formed in front of an object while '−' defocusing represents a state in which a focus is formed behind an object. Thus, the laser beam in the present invention is emitted in '+' defocusing state as shown in FIGS. 8 and 9.

Here, the focus of the laser beam is formed between a one-third point and a two-thirds point within the uppermost end and the lowermost end of the insertion portion 12. Preferably, a focus is formed at a position in the middle of the inner hole of the insertion portion 12. That is, when the height of the electrode assembly is h, and the height at which the focus is formed is z as in FIG. 10, it is preferable that the focus is formed at a position where h=2 z (here, as shown in FIG. 10, the electrode assembly has a height h so as to be in contact with or close to the bottom surface of the seating portion, and the seating portion is considered thin enough that its thickness is negligible).

Also, z may be formed in a range of $\frac{1}{3}$ h≤z≤$\frac{2}{3}$ h.

For reference, h and z shown in FIG. 10 are in case where the height of the insertion portion 12 and the height of the electrode assembly 2 are assumed to be equal to each other. However, when the height of the insertion portion 12 is greater than the height of the electrode assembly 2, the height z at which the focus is formed may further increase according to the size of the insertion portion, but the height of the focus does not exceed the height of the electrode assembly.

As described above, since the laser beam is emitted in '+' defocusing state, the diameter on the transverse section of the laser beam entering the jig 10 may be smaller than when focusing is performed at a welding region. That is, when the focusing is performed at the welding region, the inner diameter of the inner hole 13 of the insertion portion 12 further increases to avoid interference. However, in a state in which the focus moves upward by z due to '+' defocusing, the diameter on the transverse section of the laser beam at a point for entry into the insertion portion 12 is reduced, and the inner diameter of the inner hole 13 of the insertion portion 12 may also be reduced. Accordingly, the size of the jig 10 may be reduced. As illustrated in FIG. 9, the laser beam converged at the focus is emitted in a wedge shape, and thus, the diameter of the inner hole of a jig insertion portion has to increase to avoid the interference so that the focus is formed at the electrode tab 2*a*. Due to this increase in the diameter of the inner hole, the size of the center hole 2*b* of the electrode assembly 2 also has to increase, and thus, the overall capacity of the electrode assembly 2 may be limited.

Thus, the welding method according to the embodiment makes it possible to weld an electrode assembly having even a smaller size, and may minimize the size of the center hole 2*b* and increase the capacity of the electrode assembly 2.

Meanwhile, the jig 10 is made of a metal material and has sufficient strength and thermal resistance, and the insertion portion 12 entering the center hole 2*b* of the electrode assembly 2 may be manufactured to have a sufficiently small thickness.

In addition, this embodiment further provides a welding apparatus for a secondary battery, in which when the electrode assembly 2 having the center hole 2*b* is seated on the lower can 3, the electrode tab 2*a* of the electrode assembly 2 is welded to the inner bottom surface of the lower can 3.

Referring to the drawings, the welding apparatus of the present invention comprises the jig 20 and a laser irradiation apparatus 20.

The jig 10 may be formed of only the insertion portion 12 that has a pipe shape and a diameter enabling entry into the center hole 2*b* of the electrode assembly 2, or may comprise the insertion portion 12 that has a pipe shape and a diameter enabling entry into the center hole 2*b* of the electrode assembly 2 and the seating portion 11 that has an enlarged diameter to form a disk shape on an end of the insertion portion 12.

Also, the laser irradiation apparatus 20 is configured to emit a laser beam to the hole 13 of the insertion portion 12, and the laser beam is emitted such that a focus is formed within the insertion portion 12 of the jig 10 before arriving at the welding point.

That is, in a state in which the electrode assembly 2 is seated on the lower can 3 such that the electrode tab 2*a* is placed within the center hole 2*b*, the welding is performed as the laser beam is emitted to a contact point between the inner bottom surface of the lower can 3 and the electrode tab 2*a* after passing through the inner hole 13 of the insertion portion 12. The laser irradiation apparatus 20 emits the laser beam in '+' defocusing state in which a focus is formed before the laser beam arrives at the contact point between the inner bottom surface of the lower can 3 and the electrode tab 2*a*.

Thus, in order for '+' defocusing to be made, the laser irradiation apparatus 20 may be coupled to a sliding device (not shown) that may ascend and descend to adjust the formation position of the focus. The sliding device may be configured to not only raise and lower the laser irradiation apparatus 20 so as to adjust the position of the focus, but slide the laser irradiation apparatus even in the left-right and front-rear directions so as to form a plurality of welding points.

In the present invention having the above configurations, the negative electrode tab is welded by emitting the laser beam to the inside of the lower can 3. Thus, there is no welding trace left on the outer surface of the lower can, and accordingly, the commercial value may be enhanced.

Particularly, in the present invention, the laser beam is emitted in a defocusing state so that the focus is formed within the inner hole 13 formed in the insertion portion 12 of the jig, and thus, the maximum inner diameter of the laser beam entering the jig may be reduced. Accordingly, the diameter of the jig, particularly, the insertion portion 12 may be reduced, but the volume of the electrode assembly may increase (by reducing the size of the center hole). Thus, the capacity of the secondary battery may be enhanced.

Also, when the seating portion is seated on the insertion portion, the movement of the insertion portion is regulated. Thus, the welding may be stably performed.

In the present invention, when the defocusing of the laser beam is made, the focus (the seating portion may be assumed to be sufficiently thin) is formed between a one-third point and a two-thirds point within the uppermost end and the lowermost end of the insertion portion. Thus, the diameter on the transverse section of the laser beam may be minimized.

Third Embodiment

In the embodiment, provided are a monitoring apparatus and a monitoring method for a secondary battery welding process.

Figure 11:
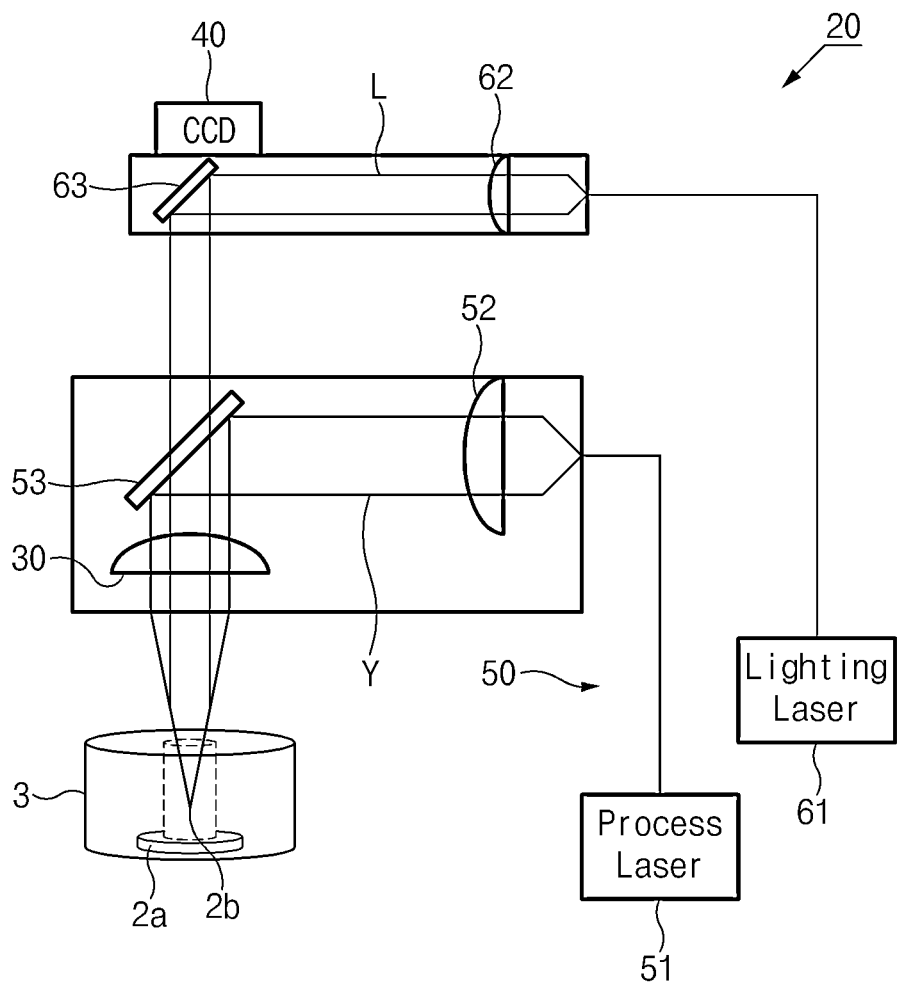
FIG. 11 is a view illustrating a simplified configuration of a monitoring apparatus for a secondary battery welding process according to a preferred embodiment according to a third embodiment of the present invention.
Figure 12:
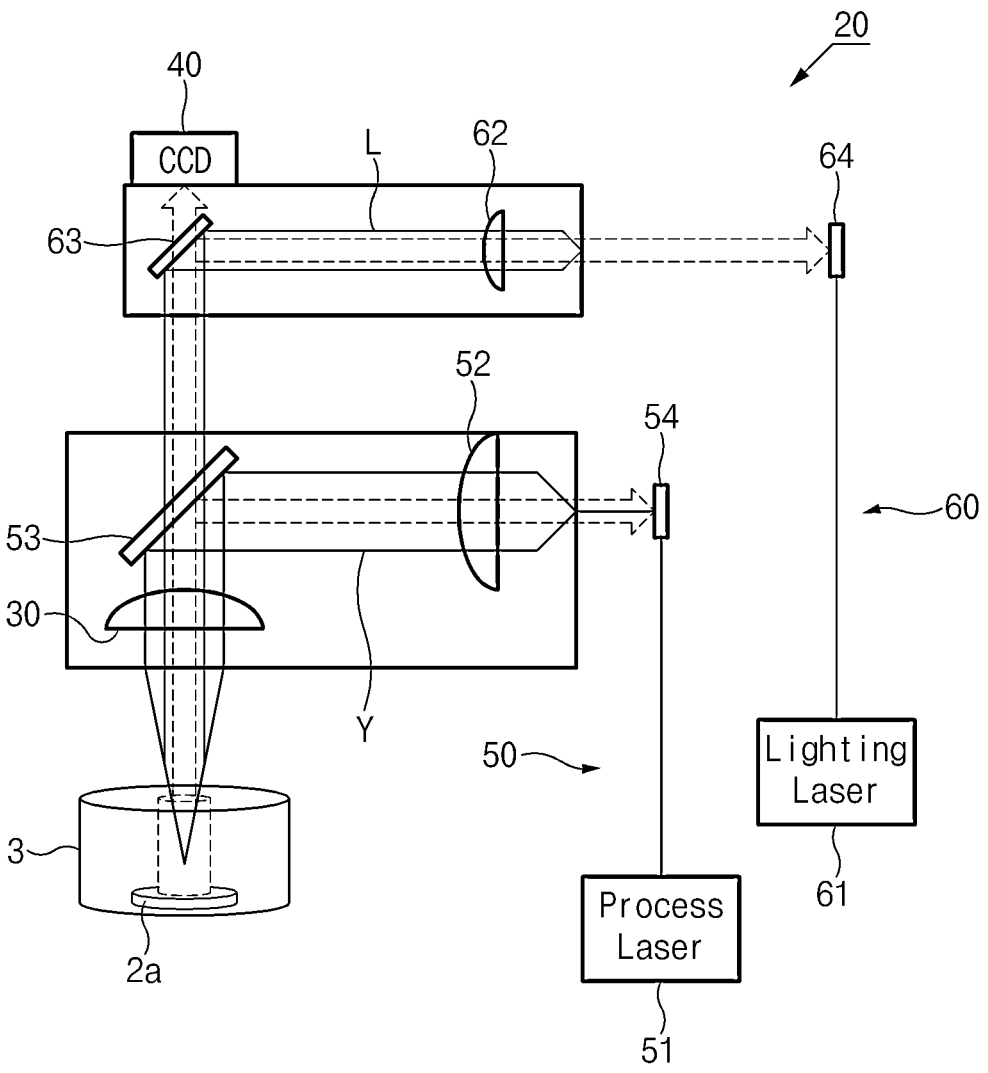
FIG. 12 is a view in which paths enabling reflection of a laser beam are indicated as dotted lines and added to the view of FIG. 11.

FIG. 11 is a view illustrating a simplified configuration of a monitoring apparatus for a secondary battery welding process according to a preferred embodiment of the present invention, and FIG. 12 is a view in which paths enabling reflection of a laser beam are indicated as dotted lines and added to the view of FIG. 11. However, in order to prevent the lines of the drawings from overlapping each other, the electrode assembly 2 and the jig 10 are omitted in FIGS. 11 and 12, and only the lower can 3 is illustrated.

Referring to FIGS. 11 and 12, the monitoring apparatus of the present invention comprises the jig 10 and the laser irradiation apparatus 20 described in the foregoing embodiments.

Here, the jig 10 may have a structure from which the seating portion 11 is deleted, that is, may be provided with only the insertion portion 12 that has a pipe shape and a diameter enabling entry into the center hole of the electrode assembly, or may be provided with both the insertion portion 12 and the seating portion 11.

Also, in the embodiment, the laser irradiation apparatus 20 emitting the laser beam to the hole of the insertion portion comprises a welding laser irradiation device 50, an illumination laser irradiation device 60, and an image sensor 40.

When the welding and monitoring are performed through the monitoring apparatus, the electrode assembly 2 is embedded in the lower can 3, and the electrode tab 2a is provided in contact with the inner bottom surface of the lower can 3.

Thus, the welding laser irradiation device 50 may emit a welding laser beam Y in a state in which the electrode assembly 2 is seated inside the lower can 3 such that the electrode tab 2a is placed within the center hole 2b.

The welding laser irradiation device 50 emits the welding laser beam Y into the center hole 2b (more accurately, into the hole of the jig insertion portion) via a focusing lens 30 to weld a contact point between the electrode tab 2a and the lower can 3.

The welding laser irradiation device 50 comprises: a welding laser oscillator 51 that emits the welding laser beam Y; a first optical insulator 54 configured such that the welding laser beam Y emitted from the welding laser oscillator 51 is allowed to pass therethrough when moving in a forward direction, but is blocked when returning; a first collimator 52 configured such that the welding laser beam Y, which has passed through the first optical insulator 54, is made parallel after passing therethrough; and a first dichroic mirror 53 configured such that the welding laser beam Y, which has passed through the first collimator 52, is reflected therefrom to the focusing lens 30.

The welding laser oscillator 51 emits the welding laser beam Y having an appropriate output, and the emitted welding laser beam Y is emitted to the first optical insulator 54. The first optical insulator 54 is a Faraday isolator and configured to transmit the laser beam only in one direction.

That is, the first optical insulator 54 is configured such that the welding laser beam Y emitted from the welding laser oscillator 51 is allowed to pass therethrough when moving in a forward direction, but (a portion by the first dichroic mirror) is blocked when returning. The detailed internal structure of the Faraday isolator is well-known in the art, and thus, the detailed description thereof will be omitted herein.

The welding laser beam Y, which has passed through the first optical insulator 54, is emitted to the first collimator 52. The first collimator 52 makes the welding laser beam Y parallel by suppressing diffusion (in a radial direction) and concentrating the beam so that the diameter thereof is maintained constant. That is, the laser beam has diffusion characteristics when emitted, but the first collimator 52 may provide this function through a combination of a plurality of optical lenses so as to suppress the diffusion of the welding laser beam Y.

The welding laser beam Y, which has passed through the first collimator 52, is emitted to the first dichroic mirror 53. The first dichroic mirror 53 may reflect a portion and allow another portion to be transmitted therethrough according to characteristics of the laser beam, and is manufactured such that the welding laser beam Y having a relatively higher output is reflected entirely therefrom.

The welding laser beam Y, which has been reflected from the first dichroic mirror 53, is emitted toward a welding point, and passes through the focusing lens 30 on an emission path and is emitted in a converged state so that a focus is formed in a welding region in which the electrode tab and the lower can are in contact with each other.

Meanwhile, the illumination laser irradiation device 60, which emits an illumination laser beam L emitted at a relatively lower output than the welding laser beam Y, is also configured to have the similar configuration to the welding laser irradiation device 50.

That is, the illumination laser irradiation device 60 comprises: an illumination laser oscillator 61 that emits the illumination laser beam L; a second optical insulator 64 configured such that the illumination laser beam L emitted from the illumination laser oscillator 61 is allowed to pass therethrough when moving in a forward direction, but is blocked when returning; a second collimator 62 configured such that the illumination laser beam L, which has passed through the second optical insulator 64, is made parallel after passing therethrough; and a second dichroic mirror 63 configured such that the illumination laser beam Y, which has passed through the second collimator 62, is reflected therefrom to the focusing lens 30. For the second dichroic mirror, a portion of the illumination laser beam Y is reflected therefrom, and another portion is transmitted therethrough so that the illumination laser beam Y reflected from the welded region is transmitted therethrough.

The illumination laser oscillator 61 emits the illumination laser beam L having an output capable of providing a sufficient amount of light to the image sensor 40 without affecting welding quality if possible, and the emitted illumination laser beam L is emitted to the second optical insulator 64.

The second optical insulator 64 is a Faraday isolator like the first optical insulator 54 and configured to transmit the illumination laser beam L only in one direction.

The illumination laser beam L, which has passed through the second optical insulator 64, is emitted to the second collimator 62. Like the first collimator 52, the second collimator 62 also makes the illumination laser beam L parallel by suppressing diffusion and concentrating the beam so that the diameter thereof is maintained constant.

The illumination laser beam L, which has passed through the second collimator 62, is emitted to the second dichroic mirror 63. The second dichroic mirror 63 is configured to reflect a portion of the illumination laser beam L and allow another portion to be transmitted therethrough.

The illumination laser beam L, which has reflected from the second dichroic mirror 63, is emitted toward the welding point. Here, the first dichroic mirror 53 allows all or almost all of the illumination laser beam L to be transmitted therethrough. The illumination laser beam L, which has passed through the first dichroic mirror 53, arrives at the welded region after passing through the focusing lens 30. Here, the illumination laser beam L before arriving the focusing lens 30 may have a diameter larger than the inner diameter of the center hole, but arrives at the welded region in a state in which the diameter becomes smaller than the inner diameter of the hole of the jig insertion portion while passing through the focusing lens 30. Also, the diameter of the illumination laser beam L reflected from the welded region may return to the original size while passing through the focusing lens 30.

The illumination laser beam L, which has been reflected from the welded region, is transmitted through the focusing lens 30, the first dichroic mirror 53, and the second dichroic mirror 63, and then arrives at the image sensor 40. Here, the focusing lens 30, the first dichroic mirror 53, and the second dichroic mirror 63 may be tuned so that for a light source of the illumination laser beam L reflected from the welded region, the amount of the light source transmitted to the image sensor 40 is greater than the amount of the light source reflected and lost. For example, the welding laser beam Y and the illumination laser beam L are different from each other in terms of laser characteristics such as outputs and/or wavelengths, and thus may be tuned such that the transmittance and reflectance when the welding laser beam Y enters and exits are different from the transmittance and reflectance when the illumination laser beam L enters and exits.

That is, the illumination laser beam L, which has been emitted from the illumination laser irradiation device 60, is transmitted through the first dichroic mirror 53, which is provided in the welding laser irradiation device 50, and the focusing lens 30 and then reflected to the image sensor 40.

Thus, in the laser irradiation apparatus 20 of the present invention, the welding laser beam Y and the illumination laser beam L may be emitted vertically from the top side of the center hole 2b (more accurately, the hole of the jig insertion portion).

Thus, in the apparatus of the present invention, the first dichroic mirror 53 is set to reflect all or most of the welding laser beam Y and allow all or most of the illumination laser beam L to be transmitted therethrough. The second dichroic mirror 63 is configured to reflect a portion of the illumination laser beam L and allow another portion to be transmitted therethrough, and thus, at least a portion of the illumination laser beam L reflected from the welding point may arrive at the image sensor 40.

Meanwhile, according to the outputs or characteristics of the laser beams, the illumination laser beam L and the welding laser beam Y may be emitted simultaneously. However, in order to avoid interference between the laser beams, the emission of the illumination laser beam L may stop when the welding laser beam Y is emitted, and the emission of the welding laser beam Y may stop when the illumination laser beam L is emitted.

More specifically, the emissions of the illumination laser beam L and the welding laser beam Y may be simultaneously performed. However, the welding laser beam Y is continuously emitted, and the emission of the welding laser beam Y may stop while the illumination laser beam L is emitted over a certain period in order to avoid the influence of interference.

In addition, this embodiment further provides a monitoring method for a secondary battery welding process.

The monitoring method according to the embodiment is a monitoring method for a secondary battery welding process, in which when an electrode assembly 2 having a center hole 2b is seated on a lower can 3, an electrode tab 2a of the electrode assembly 2 is welded to an inner bottom surface of the lower can 3. The monitoring method comprises an electrode assembly seating process, a jig seating process, a welding process, and a sensing process.

During the electrode assembly seating process, the electrode assembly 2 is seated inside the lower can 3 such that the electrode tab 2a is placed within the center hole 2b. That is, as shown in FIGS. 11 and 12, the electrode assembly 2 is seated within the lower can 3 such that the electrode assembly 2 is exposed upward. Here, the electrode tab 2a of the electrode assembly 2 and the inner bottom surface of the lower can 3 are in contact with each other, and the point at which the electrode tab 2a and the lower can 3 are in contact with each other is exposed upward in the center hole 2b formed at the center of the electrode assembly 2.

As described above, when the electrode assembly 2 is provided while being seated on the lower can 3, the jig seating process, in which the jig comprising the insertion portion having a pipe shape is seated such that the insertion portion enters the center hole, is performed, and then, the welding process is conducted.

During the welding process, the welding laser beam Y is emitted from above the hole of the insertion portion into the hole of the insertion portion via the focusing lens 30, and thus, the contact point between the electrode tab 2a and the lower can 3 is welded.

For the welding laser beam Y emitted during the welding process, it is desirable to focus on the welding point via the focusing lens 30 or slightly above the welding point (+defocusing state). However, during the emission, the welding laser beam Y is emitted so as not to damage the electrode assembly 2. Here, in order to protect the electrode assembly 2 from the welding laser beam Y, the jig 10 may have a structure in which the seating portion 11 is coupled to the upper end of the insertion portion 12 as described above.

Also, the sensing process is performed to check a welded state during the welding or after the welding. During the sensing process, the illumination laser beam L is emitted into the center hole 2b via the focusing lens 30. The image sensor 40 may receive the reflected illumination laser beam L and optically check the welding quality.

The image sensor 40 may calculate and process data about the received illumination laser beam L and provide information about the welded portion as an image. The provided image is transmitted to a separate display apparatus, or is converted into a digital signal or the like and then transmitted to an operator or a central computer controlling overall production processes.

Here, the illumination laser beam L emitted during the sensing process is emitted vertically from the upper side of the center hole 2b like the welding laser beam Y so that the illumination laser beam L may check the welding point inside the electrode assembly 2.

Meanwhile, the monitoring method of the present invention may be performed only by the welding laser irradiation device 50 without the illumination laser irradiation device 60. That is, when the welding is preformed after seating the electrode assembly 2 having the center hole 2b on the lower can 3 or after the welding is completed, the welding laser beam Y may be used as the illumination laser beam L by lowering and converting the output thereof to match the output of the illumination laser beam L.

In this case, a separate illumination laser irradiation device 60 is not required, and the monitoring is possible only with one welding laser irradiation device 50.

In the present invention having the above configurations, the welding of the electrode tab 2a is performed inside of the lower can 3, and thus, the quality of appearance may be enhanced. Also, when the welding of the electrode tab 2a is performed, the illumination laser beam L is emitted vertically in the same manner as the welding laser beam Y, and thus, the welded state may be checked and monitored more clearly.

In addition, in the present invention, the welding laser beam Y may be used as the illumination laser beam L by adjusting the output of the welding laser irradiation device 50 without using a separate illumination laser irradiation device 60. Thus, the welding apparatus may be manufactured in a more compact size, and the structure thereof may be simplified.

Although the present invention is described by specific embodiments and drawings, the present invention is not limited thereto, and various changes and modifications may be made by a person skilled in the art to which the present invention pertains within the technical idea of the present invention and equivalent scope of the appended claims.

DESCRIPTION OF THE SYMBOLS

2: Electrode assembly
3: Lower can
10: Jig
11: Seating portion
12: Insertion portion
13: Hole
20: Laser irradiation apparatus
30: Focusing lens
40: Image sensor
50: Welding laser irradiation device 51: Welding laser oscillator
52: First collimator
53: First dichroic mirror
54: First optical insulator
60: Illumination laser irradiation device
61: Illumination laser oscillator
62: Second collimator
63: Second dichroic mirror
64: Second optical insulator

The invention claimed is:

1. A welding apparatus for a secondary battery, wherein when an electrode assembly having a center hole is seated on a lower can, an electrode tab of the electrode assembly is welded to an inner bottom surface of the lower can by the welding apparatus, the welding apparatus comprising:
a jig which comprises a seating portion that has a disk shape and an insertion portion that has a pipe shape extending from a lower surface of the seating portion, the insertion portion having a diameter enabling entry into the center hole of the electrode assembly and the seating portion having a larger diameter than a diameter of an upper end of the insertion portion proximal to the seating portion; and
a laser irradiation apparatus configured to emit a laser beam into a hole of the insertion portion,
wherein, when the electrode assembly is seated on the lower can such that the electrode tab is placed within the center hole, the laser irradiation apparatus is configured to perform welding as the laser beam is emitted to a contact point between the inner bottom surface of the lower can and the electrode tab after passing through the hole of the insertion portion of the jig.

2. The welding apparatus of claim 1, wherein, when the electrode assembly is seated on the lower can for the welding, the seating portion is configured to be disposed on the electrode assembly seated on the lower can with the lower can having a cylindrical shape of which a lower side is closed by the inner bottom surface and a top side is open, and the diameter of the seating portion is configured to be greater than a diameter of the lower can so that the seating portion is configured to be seated above the lower can when the insertion portion is inserted into the center hole of the electrode assembly mounted to the lower can.

3. The welding apparatus of claim 1, wherein, when the seating portion is seated above the lower can as the insertion portion of the jig brings the electrode tab into close contact with the inner bottom surface of the lower can, a height of the insertion portion is 5 mm or less, and an inner diameter of the hole of the insertion portion is in a range from 0.25 to 1.5 mm.

4. The welding apparatus of claim 1, wherein, when the seating portion is seated above the lower can as the insertion portion of the jig brings the electrode tab into close contact with the inner bottom surface of the lower can, a height of the insertion portion is 5 mm or less, and an inner diameter of the hole of the insertion portion is in a range from 0.53 to 1.5 mm.

5. The welding apparatus of claim 1, wherein a height and a diameter of the lower can are determined so that a ratio of the height to the diameter is in a range from 0.35 to 0.6.

6. The welding apparatus of claim 1, wherein a hole along a longitudinal direction of the insertion portion has a shape in which a diameter is greatest on a side, in which the seating portion is formed, and decreases gradually in a direction away therefrom.

7. The welding apparatus of claim 1, wherein the seating portion has a shape which has a greater height at an edge portion and becomes gradually lower in a direction toward a hole of the center.

8. The welding apparatus of claim 1, wherein the seating portion has a recessed groove on a side surface so that an upper end of the lower can is configured to be inserted therein when the insertion portion enters the center hole.

9. The welding apparatus of claim 1, wherein the insertion portion has a length configured to enable the electrode tab to come into close contact with the inner bottom surface of the lower can when the insertion portion enters the center hole.

10. The welding apparatus of claim 1, wherein the jig includes a metal material.

11. The welding apparatus of claim 10, wherein a bottom surface of the seating portion facing the electrode assembly and a surface of the insertion portion are coated with an insulating layer for insulating electricity.

12. The welding apparatus of claim 11, wherein the insulating layer includes a material having lower thermal conductivity than the jig.

13. The welding apparatus of claim 1, wherein the laser beam is emitted in a defocusing state in which a focus is formed before the laser beam arrives at the contact point between the inner bottom surface of the lower can and the electrode tab.

* * * * *